United States Patent
Nouvel et al.

(10) Patent No.: US 8,115,672 B2
(45) Date of Patent: Feb. 14, 2012

(54) METHOD OF MEASURING DISTANCE, NOTABLY FOR SHORT-RANGE RADAR

(75) Inventors: Myriam Nouvel, Elancourt (FR); Stéphane Kemkemian, Paris (FR)

(73) Assignee: Thales (FR)

( * ) Notice: Subject to any disclaimer, the term of this patent is extended or adjusted under 35 U.S.C. 154(b) by 155 days.

(21) Appl. No.: 12/698,911

(22) Filed: Feb. 2, 2010

(65) Prior Publication Data
US 2011/0187583 A1     Aug. 4, 2011

(51) Int. Cl.
*G01S 13/08* (2006.01)
(52) U.S. Cl. ........ 342/118; 342/127; 342/129; 342/137; 342/70
(58) Field of Classification Search .................. 342/118, 342/127–129, 134–137, 70–72
See application file for complete search history.

(56) References Cited

U.S. PATENT DOCUMENTS

| | | | |
|---|---|---|---|
| 6,023,238 A * | 2/2000 | Cornic et al. ................. | 342/129 |
| 6,686,871 B2 * | 2/2004 | Rohling et al. ............... | 342/109 |
| 6,859,167 B2 * | 2/2005 | Artis ............................. | 342/128 |
| 7,791,528 B2 * | 9/2010 | Klotzbuecher et al. ....... | 342/112 |
| 7,791,530 B2 * | 9/2010 | Puglia .......................... | 342/128 |
| 2006/0079749 A1 | 4/2006 | Hurst et al. | |
| 2011/0037642 A1 * | 2/2011 | Stove ............................ | 342/128 |
| 2011/0187583 A1 * | 8/2011 | Nouvel et al. ................. | 342/129 |
| 2011/0193738 A1 * | 8/2011 | Cornic et al. .................. | 342/27 |

FOREIGN PATENT DOCUMENTS

| | | |
|---|---|---|
| EP | 601884 A2 * | 6/1994 |
| EP | 0 867 731 A1 | 9/1998 |
| EP | 1 028 323 A2 | 8/2000 |
| FR | 2 765 691 A1 | 1/1999 |
| FR | 2 877 438 A1 | 5/2006 |
| JP | 04052586 A * | 2/1992 |

* cited by examiner

*Primary Examiner* — John Sotomayor
(74) *Attorney, Agent, or Firm* — Baker & Hostetler, LLP

(57) ABSTRACT

The present invention relates to a procedure for measuring distance. It applies notably in respect of short-range radars, but not exclusively. The method uses an electromagnetic wave comprising at least one emission sequence (31, 32, 33, 34, 35) of the FSK type, at least two emission frequencies ($F_1$, $F_2$), emitted successively towards the said target a given number of times inside the sequence. The gap $\delta F$ between the emission frequencies ($F_1$, $F_2$) is substantially equal to an integer number k of times the repetition frequency (SPRF) of the cycle of frequencies, the distance measurement being obtained on the basis of the measurement of difference of phases $\Delta\phi$ between the signals received corresponding respectively to a first frequency ($F_1$) and to a second frequency ($F_2$).

7 Claims, 2 Drawing Sheets

METHOD OF MEASURING DISTANCE, NOTABLY FOR SHORT-RANGE RADAR

FIELD OF THE INVENTION

The present invention relates to a procedure for measuring distance. It applies notably in respect of short-range radars, but not exclusively.

BACKGROUND OF THE INVENTION

Short-range mobile radars have several applications. Mention may notably be made of:
- radars for detecting the arrival of missiles, these radars being fitted to aircraft or any other platform;
- radars fitted to so-called "Sense and Avoid" systems;
- radars fitted to automobiles, for speed regulation or anti-collision functions for example;
- radars for detecting nearby objects.

For cost reasons, such radars frequently use a waveform having very few distance gates, and even in certain cases a single distance gate. These radars may be of the pulsed wave or continuous wave type.

Conventionally, a pulsed radar deduces the distance to an object from the delay between the instant of emission of the wave and the reception of its echo. In practice, a certain number of distance gates whose duration is close to the inverse of the band of the signal emitted is used. The distance is deduced from the position of the distance gate corresponding to the maximum signal level received and it can be refined on the basis of the relative measurement of the level of the signal received in the adjacent gates.

Another known scheme for measuring distance is to emit a sequence of at least two emission frequencies that are slightly shifted, generally of the order of a kHz to a hundred kHz. The emitted wave is called FSK, the acronym standing for "Frequency Shift Keying". In the case where two frequencies $F_1$ and $F_2$, spaced $\delta F$ apart, are emitted alternately, the differential phase shift between the two returns corresponding respectively to the pulses at the frequency $F_1$ and to the pulses at the frequency $F_2$ is given by the following relation:

$$\delta\varphi = 4\pi\frac{R\delta F}{c} + 2\pi F_D \Delta T \quad (1)$$

Where R represents the distance to the target, c the speed of light, $F_D$ the Doppler effect due to the relative mobility of the target and $\Delta T$ the time interval between the successive emissions of the sequences at $F_1$ and $F_2$.

The distance R is therefore obtained by measuring the phase difference $\Delta\phi$ after having eliminated the residual bias due to the mean Doppler effect $F_D$ by virtue of Doppler analysis and by assuming that there is no Doppler ambiguity. The maximum distance measured is attained when $\Delta\phi=2\pi$:

$$R < \frac{c}{2\delta F} \quad (2)$$

These solutions exhibit several drawbacks. In particular if the frequency gap $\delta F$ is large, the distance measurement is accurate, for a given signal-to-noise ratio, but the measurement rapidly runs the risk of being ambiguous on a remote target with a radar cross section large enough to produce a detection. Conversely if $\delta F$ is small, the risk of ambiguous distance measurement is low but this measurement is rather inaccurate.

SUMMARY OF THE INVENTION

An aim of the invention is notably to alleviate the aforesaid drawbacks. For this purpose, the subject of the invention is a method of measuring the distance of a target using an electromagnetic wave comprising at least one emission sequence of the FSK type at least two emission frequencies $F_1$, $F_2$ emitted successively towards the said target a given number (p) of times inside the sequence forming a repetition cycle of the emission frequencies $F_1$, $F_2$, the gap $\delta F$ between the emission frequencies $F_1$, $F_2$ being substantially equal to an integer number k, k being greater than or equal to 1, of times the repetition frequency SPRF of the cycle of frequencies, the distance measurement being obtained on the basis of the measurement of difference of phases $\Delta\phi$ between the signals received corresponding respectively to a first frequency $F_1$ and to a second frequency $F_2$.

The method comprises for example a number N of successive emission sequences, N being greater than or equal to two, the pairs of frequencies being defined in such a way that the frequency gaps are different from one pair to another and are an integer multiple of the repetition frequency SPRF.

The distance measurement is for example performed on the basis of measurements of phase differences $\Delta\phi$ between the signals received originating from the various frequencies $F1_i$, $F2_i$, where $F_{1,i} \neq F_{1,j}$ and $F_{2,i} \neq F_{2,j}$, $\forall i \neq j$, of each sequence, the various measurements making it possible to remove the ambiguity in the distance measurement by cross-checking the possibly ambiguous measurements.

The non-ambiguous distance R is for example obtained by solving the system of inequalities below, on the basis of the measurements of phase differences $\Delta\phi_i$, $\Delta\phi_j$, . . . , $\Delta\phi_m$ performed in the sequences of order i, j, . . . , m:

$$\begin{cases} \Delta\varphi_i \leq \left(\left(\frac{4\pi\delta F_i}{c}R + \varepsilon_i\right)\mathrm{mod}2\pi\right)\mathrm{mod}2\pi \\ \Delta\varphi_i \geq \left(\left(\frac{4\pi\delta F_i}{c}R - \varepsilon_i\right)\mathrm{mod}2\pi\right)\mathrm{mod}2\pi \end{cases}$$

$$\begin{cases} \Delta\varphi_j \leq \left(\left(\frac{4\pi\delta F_j}{c}R + \varepsilon_j\right)\mathrm{mod}2\pi\right)\mathrm{mod}2\pi \\ \Delta\varphi_j \geq \left(\left(\frac{4\pi\delta F_j}{c}R - \varepsilon_j\right)\mathrm{mod}2\pi\right)\mathrm{mod}2\pi \end{cases}$$

$$\begin{cases} \Delta\varphi_k \leq \left(\left(\frac{4\pi\delta F_k}{c}R + \varepsilon_k\right)\mathrm{mod}2\pi\right)\mathrm{mod}2\pi \\ \Delta\varphi_k \geq \left(\left(\frac{4\pi\delta F_k}{c}R - \varepsilon_k\right)\mathrm{mod}2\pi\right)\mathrm{mod}2\pi \end{cases}$$

$\delta F_i$, $\delta F_j$, . . . , $\Delta F_m$ being the frequency gaps between the emission frequencies $F_1$, $F_2$ inside the sequences, the terms $\epsilon_i$, $\epsilon_j$, . . . , $\epsilon_m$ taking into account the errors in the phase difference measurements.

A measurement of difference of phases $\Delta\phi$ can be performed when the power of the received signals is greater than a given threshold.

The subject of the invention is also a radar implementing this method

Advantageously, this radar is fitted for example to a motor vehicle so as to measure the distance between the carrier vehicle and other vehicles.

BRIEF DESCRIPTION OF THE DRAWINGS

Other characteristics and advantages of the invention will be apparent with the aid of the description which follows offered in relation to appended drawings which represent.

MORE DETAILED DESCRIPTION

Figure 1:
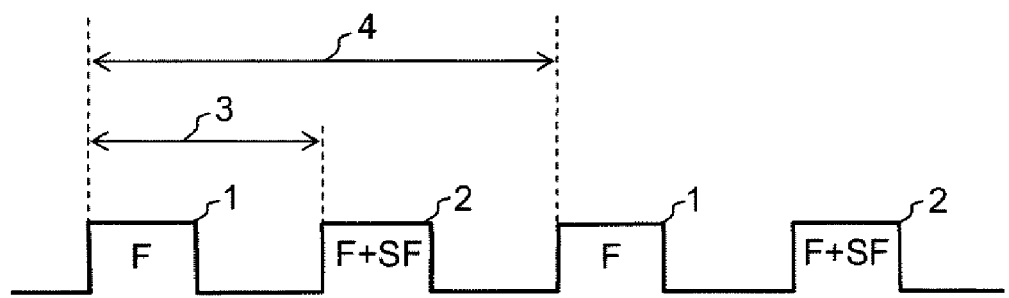
FIG. 1, an exemplary waveform of the FSK type.

FIG. 1 illustrates an exemplary FSK waveform with two frequencies used in a solution according to the prior art. More particularly, it exhibits as a function of time t the emission intervals 1, 2 according to two frequencies $F_1$ and $F_2$.

The radar therefore emits pulses 1, 2 alternately on two frequencies $F_1$ and $F_2$, $F_2$ being equal to $F_1+\Delta F$. If the radar employs only one distance gate after the pulse at $F_1$ and another after the pulse at $F_2$, the frequency gap $\delta F$ is chosen so as to satisfy the following compromise:

If $\delta F$ is large, i.e. $d\phi/dR$ high, the distance measurement is accurate, for a given signal-to-noise ratio S/N, on the other hand the measurement rapidly runs the risk of being ambiguous on a remote target with a radar cross section (RCS) large enough to produce a detection. In this case, and without other complementary processing, a false distance is associated with this target.

Conversely, if $\delta F$ is small, the risk of ambiguous distance measurement is low but this measurement is rather inaccurate.

Moreover, the ambiguity in speed corresponds to the repetition frequency of the frequency cycle SPRF corresponding to the inverse of the repetition period of the waveform 4, denoted SPRI, i.e. SPRF=1/SPRI. The ambiguity does not in fact correspond to the frequency of the pulses PRF=1/PRI where PRI represents the repetition period 3 of the pulses. If one wishes to preserve a high value of speed ambiguity, it is necessary to reduce the interval between two emission pulses at distinct frequencies. This reduces the maximum distance where an echo emitted at the frequency $F_1$, respectively $F_2$, is received before the emission of the following pulse, respectively $F_1$.

The consequence is that, when such a waveform 1, 2 is employed aboard an airborne radar, the domain where the ground clutter is illuminated and gives significant returns does indeed extend beyond a delay equal to PRI. It follows that:

the sequence which follows the emission of a pulse at a frequency F contains clutter illuminated by the pulses emitted at this frequency F, for even ambiguity ranks, but also clutter illuminated by the previous pulses emitted at F+δF, for odd ambiguity ranks, the term "ambiguity rank of order k" here denoting the number of pulses k which separate the emission from the reception of the echo of an object, and not the ambiguity in the sense of the differential phase according to relation (1);

the sequence which follows the emission of a pulse at a frequency F+δF contains clutter illuminated by the pulses emitted at this frequency F+δF, for even ambiguity ranks, but also clutter illuminated by the previous pulses emitted at F+δF, for odd ambiguity ranks.

Figure 2A:
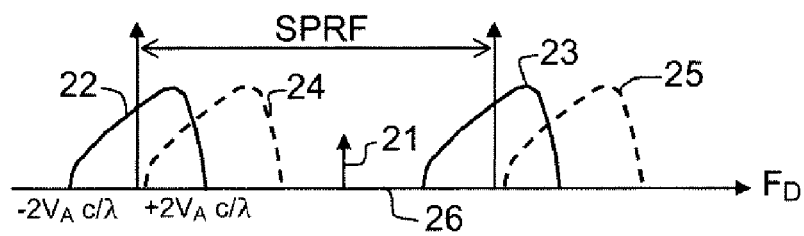
FIGS. 2a and 2b, respective illustrations of the spectrum of the signals received in a distance gate after the pulse at the first frequency $F_1=F$ and the spectrum of the signals received in the distance gate after the pulse at the frequency $F_2=F+\Delta F$.
Figure 2B:
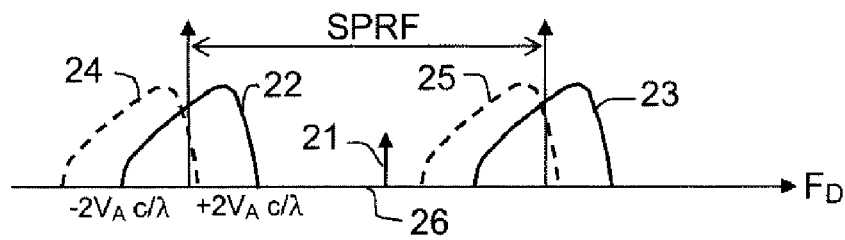

FIGS. 2a and 2b respectively illustrate the spectrum of the signals received in the distance gate after the pulse at the frequency $F_1=F$ and the spectrum of the signals received in the distance gate after the pulse at the frequency $F_2=F+\delta F$, in the case of an airborne application for example.

More particularly, FIG. 2a illustrates the spectrum, as a function of Doppler frequency, that is obtained after having sampled the signals over several repetition periods SPRI of the FSK code, after the emission at the frequency F. A first spectral line 21 corresponds to the frequency reflected by the target. This spectral line 21 is situated at the centre on two frequencies separated by the repetition frequency SPRF themselves centred on a spectrum 22, 23 of ground clutter as echo of the pulses at the frequency F and being spread between $-2V_{AC}/\lambda$, and $+2V_{AC}/\lambda$, around this frequency.

Two ground clutter spectra 24, 25 of identical form in response to the echoes of the pulses at the frequency F+δF are shifted by the frequency δF with respect to the previous ground clutter spectra.

FIG. 2b illustrates the spectrum, as a function of Doppler frequency, that is obtained after having sampled the signals over several repetition periods SPRI of the FSK code, after the emission at the frequency F+δF. In this case, the spectral line 21 corresponding to the target echo is centred on the ground clutter spectra corresponding to the pulses at the frequency F+δF, the ground clutter spectra corresponding to the pulses at the frequency F being shifted by δF.

It is apparent that a low value of the frequency gap δF:

preserves a speed domain 26 devoid of extended ground clutter as shown by FIGS. 2a and 2b, indeed if δF is low, the ground clutter spectra on one side 22, 24 and on the other 23,25 are very close and leave a significant space free of clutter between the two groupings of spectra 22, 24, 23, 25;

minimizes the risks of distance ambiguity on very remote targets resulting from the measurement of the differential phase in accordance with relation (1);

but provides notably a rather inaccurate distance measurement as shown by relation (2).

Conversely, a high value of the frequency gap δF:

provides an accurate distance measurement, as long as the measurement is not ambiguous;

reduces the speed domain 26 devoid of ground clutter by making the spectra 23, 24 closer;

increases the risks of distance ambiguity on very remote targets.

The invention makes it possible notably to meet these three performance criteria, namely:

the preservation of a speed domain 26 divested of extended ground clutter;

minimizing the risk of distance ambiguity on very remote targets;

accurate distance measurement.

Figure 3:
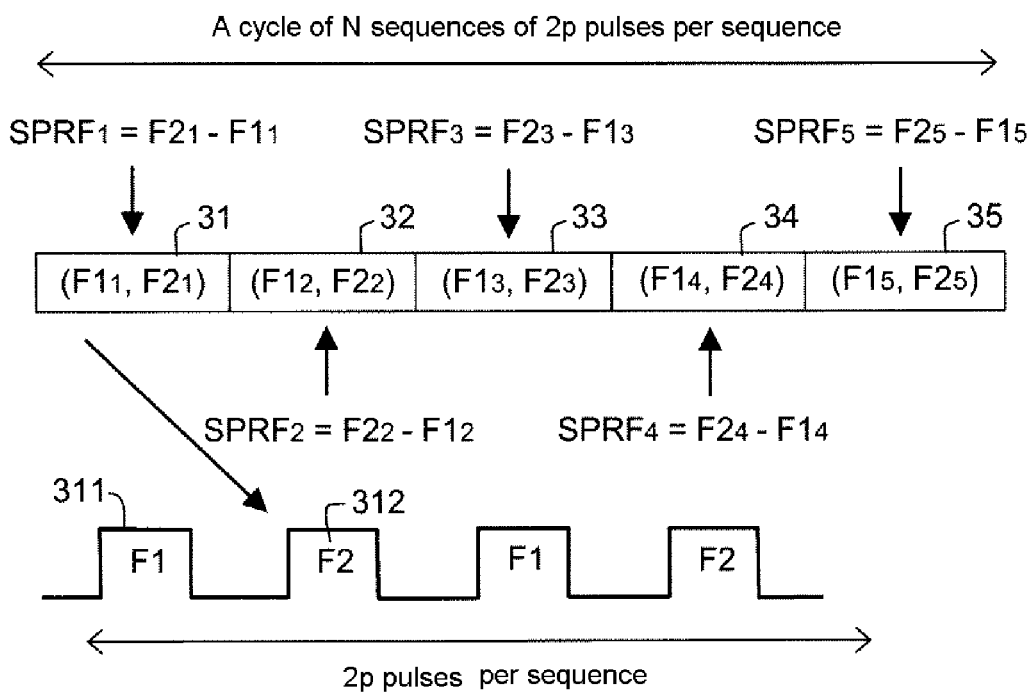
FIG. 3, an illustration of the operating principle of a radar implementing the method according to the invention, successively emitting sequences of waveforms of the FSK type with different pairs of frequencies from one sequence to another.

FIG. 3 illustrates the operating principle of the invention by presenting an example of emission cycles. In this example, the radar uses an FSK pattern with two alternating pulses of frequencies $F_1$ and $F_2=F_1+\delta F$.

The radar emits a cycle of N sequences 31, 32, 33, 34, 35 of 2p pulses 311, 312 per sequence, each sequence comprising pulses alternately at $F_1$ and $F_2$.

Thus, firstly we choose δF=kSPRF, k being an integer. As shown by FIGS. 2a and 2b, this leads to the superposition in one and the same Doppler region of the ground clutter returns of the even ambiguity ranks 24, 25 and odd ambiguity ranks 22, 23. For a given value of SPRF, the biggest possible zone devoid of ground clutter 26 is then obtained. A value of δF that is slightly different from the aforesaid value can nevertheless be used, provided that the superposition of the ambiguous clutter returns does not significantly increase the minimum spectral spreading 22, 23, 24, 25 that can be obtained. Moreover, it is generally possible to choose k=1, other values obviously being possible.

At this juncture, a high value of δF leads to very accurate but ambiguous distance measurements being made on targets with significant RCSs which are detectable beyond a distance such that the differential phase rotation, such as defined by relation (1), is ambiguous, that is to say Δφ>2π.

Secondly, a certain number N of sequences of pairs of alternating emission frequencies $F1_i$, $F2_i$ is emitted, of the type of that $F_1$, $F_2$ defined previously and satisfying the following conditions:

$\delta F_i = F2_i - F1_i$ for $i$ an integer belonging to the interval [1, N] (3)

$\delta F_i = kSPRF$, $k$ being an integer (4)

$\delta F_i \neq \delta F_j$ whatever $i \neq j$ belonging to the interval [1, N] (5)

It is possible to choose k=1.

For N sequences, N distinct values of possibly ambiguous phase shifts are obtained, for a given target. The comparison of at least two values of phase shifts obtained with judiciously chosen frequency gaps $\delta F_i$ makes it possible to obtain a distance measurement without ambiguity, while being more accurate than the schemes according to the prior art.

A radar according to the invention therefore emits cycles of N sequences of p alternating emission pairs $F1_i$, $F2_i$ as illustrated by FIG. 3 and satisfying the conditions above (3) to (5). In the example of FIG. 3, the number N of sequences is equal to 5.

In each of the sequences 31, 32, 33, 34, 35 the radar processing means calculate the fast Fourier transform FFT of the p samples of the signal received corresponding to the first frequency $F_1$ and then to the second frequency $F_2$, that is to say in fact to the frequencies $F1_i$, $F2_i$, i belonging to the interval [1, 5]. The spectrum of signals received, that is to say the distribution of the power of these signals received as frequencies, is obtained through this FFT.

A detection criterion is defined. This criterion takes into account notably a threshold of power received which makes it possible to circumvent false alarms. The level of this threshold can be determined in several ways, by simulation, experimentally or by calculation for example.

If the detection criterion is satisfied, that is to say a target is supposedly detected, the radar processing means calculate the differential phase between the returns corresponding to the frequency $F_1$ and to the frequency $F_2$, doing so for each of the sequences. This phase is thereafter corrected of the bias due to the Doppler effect.

On completion of the analyses on the N sequences of pairs of alternating emission frequencies $F1_i$, $F2_i$, Q measurements of differential phase are obtained, Q being less than or equal to N. Q is equal to N if the detection criterion is satisfied for all the sequences.

If Q is greater than or equal to two, that is to say if at least two measurements of differential phase are obtained, the non-ambiguous distance is obtained for example by solving the following system of inequalities (6), (7), (8), on the basis of the differential measurements performed in the sequences of order i, j, k, Q being taken in this example equal to 3:

$$\begin{cases} \Delta \varphi_i \leq \left( \left( \frac{4\pi \delta F_i}{c} R + \varepsilon_i \right) \bmod 2\pi \right) \bmod 2\pi \\ \Delta \varphi_i \geq \left( \left( \frac{4\pi \delta F_i}{c} R - \varepsilon_i \right) \bmod 2\pi \right) \bmod 2\pi \end{cases} \quad (6)$$

$$\begin{cases} \Delta \varphi_j \leq \left( \left( \frac{4\pi \delta F_j}{c} R + \varepsilon_j \right) \bmod 2\pi \right) \bmod 2\pi \\ \Delta \varphi_j \geq \left( \left( \frac{4\pi \delta F_j}{c} R - \varepsilon_j \right) \bmod 2\pi \right) \bmod 2\pi \end{cases} \quad (7)$$

$$\begin{cases} \Delta \varphi_k \leq \left( \left( \frac{4\pi \delta F_k}{c} R + \varepsilon_k \right) \bmod 2\pi \right) \bmod 2\pi \\ \Delta \varphi_k \geq \left( \left( \frac{4\pi \delta F_k}{c} R - \varepsilon_k \right) \bmod 2\pi \right) \bmod 2\pi \end{cases} \quad (8)$$

The terms $\varepsilon_i$, $\varepsilon_j$, $\varepsilon_k$ take into account the errors in the differential phase measurements. They are linked to the signal-to-noise ratio and belong to a given interval.

The usual mathematical techniques known to those skilled in the art are employed to solve the above system of inequalities.

The invention thus advantageously makes it possible to perform accurate distance measurements without requiring the use of a waveform with several distance gates.

The invention claimed is:

1. A method of measuring the distance of a target using an electromagnetic wave comprising at least one emission sequence of the FSK type at least two emission frequencies ($F_1$, $F_2$) emitted successively towards the said target a given number (p) of times inside the sequence forming a repetition cycle of the emission frequencies ($F_1$, $F_2$), the gap (δF) between the emission frequencies ($F_1$, $F_2$) being substantially equal to an integer number k, k being greater than or equal to 1, of times the repetition frequency (SPRF) of the cycle of frequencies, the distance measurement being obtained on the basis of the measurement of difference of phases (Δφ) between the signals received corresponding respectively to a first frequency ($F_1$) and to a second frequency ($F_2$).

2. The method according to claim 1, wherein it comprises a number N of successive emission sequences, N being greater than or equal to two, the pairs of frequencies being defined in such a way that the frequency gaps are different from one pair to another and are an integer multiple of the repetition frequency (SPRF).

3. The method according to claim 2, wherein the distance measurement is performed on the basis of measurements of phase differences (Δφ) between the signals received originating from the various frequencies ($F1_i$, $F2_i$), with $F_{1,i} \neq F_{1,j}$ and $F_{2,i} \neq F_{2,j}$, $\forall i \neq j$, of each sequence, the various measurements making it possible to remove the ambiguity in the distance measurement by cross-checking the possibly ambiguous measurements.

4. The method according to claim 3, wherein the non-ambiguous distance R is obtained by solving the system of inequalities below, on the basis of the measurements of phase differences $\Delta \varphi_i$, $\Delta \varphi_j$, ..., $\Delta \varphi_m$ performed in the sequences of order i, j, ..., m:

$$\begin{cases} \Delta \varphi_i \leq \left( \left( \frac{4\pi \delta F_i}{c} R + \varepsilon_i \right) \bmod 2\pi \right) \bmod 2\pi \\ \Delta \varphi_i \geq \left( \left( \frac{4\pi \delta F_i}{c} R - \varepsilon_i \right) \bmod 2\pi \right) \bmod 2\pi \end{cases}$$

-continued $$\begin{cases} \Delta\varphi_j \leq \left(\left(\frac{4\pi\delta F_j}{c}R + \varepsilon_j\right)\bmod 2\pi\right)\bmod 2\pi \\ \Delta\varphi_j \geq \left(\left(\frac{4\pi\delta F_j}{c}R - \varepsilon_j\right)\bmod 2\pi\right)\bmod 2\pi \end{cases}$$

$$\begin{cases} \Delta\varphi_k \leq \left(\left(\frac{4\pi\delta F_k}{c}R + \varepsilon_k\right)\bmod 2\pi\right)\bmod 2\pi \\ \Delta\varphi_k \geq \left(\left(\frac{4\pi\delta F_k}{c}R - \varepsilon_k\right)\bmod 2\pi\right)\bmod 2\pi \end{cases}$$

$\delta F_i, \delta F_j, \ldots, \delta F_m$ being the frequency gaps between the emission frequencies ($F_1$, $F_2$) inside the sequences, the terms $\epsilon_i, \epsilon_j, \ldots, \epsilon_m$ taking into account the errors in the phase difference measurements.

5. The method according claim 3, wherein a measurement of difference of phases ($\Delta\phi$) is performed when the power of the received signals is greater than a given threshold.

6. A radar implementing the method according to claim 1.

7. The radar according to claim 6, wherein it is fitted to a motor vehicle so as to measure the distance between the carrier vehicle and other vehicles.

\* \* \* \* \*